Feb. 4, 1969 G. WILHELM 3,425,825

METHOD OF PRODUCING INTERMETALLIC SUPERCONDUCTING COMPOUNDS OF NIOBIUM AND GALLIUM

Filed Dec. 17, 1964 Sheet 1 of 2

3,425,825

METHOD OF PRODUCING INTERMETALLIC SUPERCONDUCTING COMPOUNDS OF NIOBIUM AND GALLIUM

Günther Wilhelm, Erlangen-Buckenhof, Germany, assignor to Siemens Aktiengesellschaft, Munich, Germany Filed Dec. 17, 1964, Ser. No. 419,026
Claims priority, application Germany, Dec. 21, 1963, S 88,845
U.S. Cl. 75—62 1 Claim
Int. Cl. C22c *1/00, 31/00;* H01v *11/12*

My invention relates to a method of producing intermetallic superconducting compounds such as compounds of niobium with tin, gallium, aluminum or compounds of vanadium with gallium or silicon.

Such and various other intermetallic compounds have been found to be particularly good superconductors. For example the transition temperature below which the intermetallic compound niobium-tin (niobium stannate, $Nb_3Sb$) is superconducting lies at about 18° K. Since this compound, aside from the high transition point, has good superconducting properties also in other respects, such as a high critical magnetic field, there is an urgent demand for the preparation of this compound in large quantity and high purity for scientific and technological purposes. Wires and tapes of niobium stannate are employed, for example, in the form of superconducting coils for generating extremely strong magnetic fields.

However, there has been no simple manner of chemically producing niobium stannate. Resort has been taken, therefore, to metallurgical sintering methods. Accordingly, niobium and tin are mixed in the stoichiometric ratio and then sintered at high temperature. The resulting material is very porous and brittle and its superconducting properties often depend upon the sintering temperature. This greatly limits or aggravates the technological use of sintered niobium stannate.

The first successful attempt at producing niobium stannate by a chemical method involves its precipitation from the gaseous phase. In this method, the gaseous chlorides of niobium and tin are simultaneously reduced by hydrogen at temperatures between 900° and 1200° C., and niobium stannate is precipitated onto the surface of a solid carrier substance, for example the wall of a quartz tube or on metallic wires or tapes (French Patents 1,322,-694 and 1,322,777).

I have discovered, according to the present invention that niobium stannate, as well as intermetallic superconducting compounds in general, can be produced by precipitation from the gaseous phase with a significantly improved growth and yield of the evolving compound, as compared with the production of the compounds via the chlorides of the metallic components.

According to the invention, an intermetallic superconducting compound is produced by reduction of the gaseous bromides or iodides of the respective metallic constituents, and these halogen compounds are prepared by passing gaseous bromine or iodine mixed with inert transporting gas over a heated starting material consisting of the metallic constituents of the intermetallic compounds. The evolving metal bromide or iodide is then subjected to reduction, resulting in the precipitation of the solid superconducting compound upon a solid carrier or substrate.

The method according to the invention affords producing not only niobium stannate ($Nb_3Sn$), but also other superconducting intermetallic compounds, for example niobium-gallium ($Nb_3Ga$), vanadium-gallium ($V_3Ga$), niobium-aluminum ($Nb_3Al$), niobium-indium ($Nb_3In$) or vanadium-silicon ($V_3Si$). It is to be noted that the chemical formulas given in parentheses represent only approximately the actual composition of the compounds which possess a relatively wide compositional range of existence. For example, the compound niobium stannate, made according to the invention, possesses beta tungsten structure. The chemical analysis reveals a composition of $Nb_{3.66}Sn$. Similar departures from the strict stoichiometric $A_3B$ toward the composition $A_4B$ are also involved in the other intermetallic compounds exemplified in the foregoing. A denoting niobium or vanadium, and B denoting tin, gallium, indium or silicon.

Niobium-stannate made by the method according to the invention exhibits a clearly better growth than when the same compound is being produced by reduction of chlorides. Thus, the novel method has resulted in considerably larger crystals, and entire tubular pieces of niobium stannate have also been made in this manner. This is believed to be due to the fact that bromine and iodine, employed in the method according to the invention, react more slowly and less vigorously than chlorine.

In the known method of producing niobium stannate by reduction of chlorides, it is necessary to pass not only chlorine but also hydrogen chloride (HCl) over the components of the compound to be produced. If only chlorine is passed over heated tin, there occurs only $SnCl_4$ which is not stable at the high reaction temperature. The stable $SnCl_2$ required for the reaction, is formed only when passing HCl over heated tin. Without the supply of hydrogen chloride, no niobium stannate is produced.

In the production method according to the invention, a supply of hydrogen bromide or hydrogen iodide is not necessary because the bromides or iodides formed when passing bromine or iodine over the metallic components are stable at the temperatures involved. Consequently, in the method according to the invention, the quantity of halogen participating in the reaction can be more accurately adjusted than in the known method. By correspondingly selecting the flow rate of the inert gas serving as a transporting medium, the optimal conditions for the precipitation of the intermetallic compound can be controlled much more simply and reliably than in the known method. The resulting intermetallic compound exhibits a better formation, the lower the flowing speed of the inert gas and the smaller the added halogen quantity are chosen.

The method of the invention will be further described with reference to the accompanying drawings.

FIG. 1 shows schematically an embodiment of a reaction tube for performing the method of the invention.

FIG. 1*a* shows a portion of the reaction tube according to FIG. 1 with separately located components of the starting material.

Figure 1:
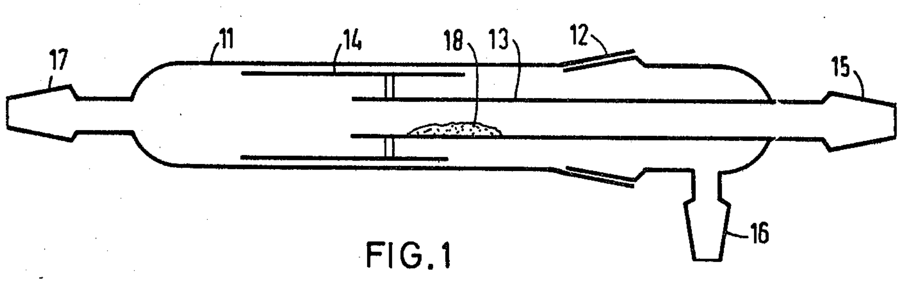

The tubular reaction vessel according to FIG. 1 comprises a quartz tube 11 into which a second, thinner tube 13 is inserted with the aid of a conical, ground sealing neck 12. The tube 13 extends approximately to the middle of the tube 11. Mounted on the end of tube 13 is a short cylindrical piece 14 upon which the evolving reaction material is to precipitate. Gas is blown through an inlet nipple 15 into the inner tube 13. An additional amount of gas may be blown into the outer tube 11 through a lateral inlet nipple 16. The residual gases leave the vessel through an outlet nipple 17. The solid starting material 18 for the reaction is shown located in the tube 13.

Figure 1A:
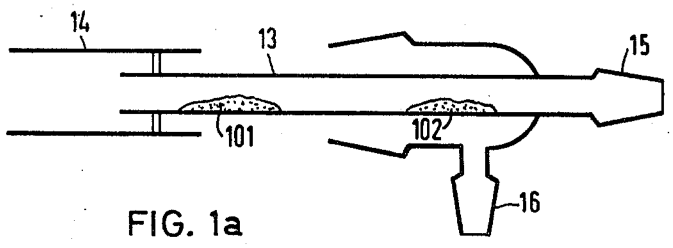

FIG. 1*a* shows separately a portion of the reaction vessel according to FIG. 1. In contrast to FIG. 1, the two metallic components 101 and 102 are separately placed into the inner tube 13.

Figure 2:
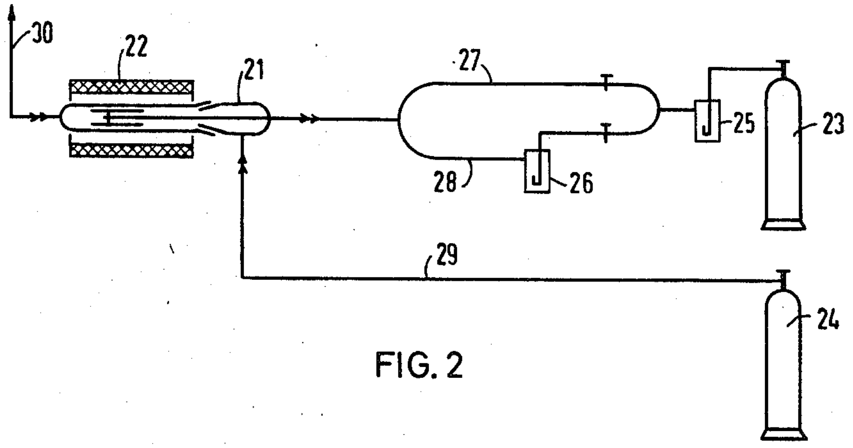
FIG. 2 shows schematically an embodiment of an entire plant for performing the method of the invention, using bromine as reaction gas.

The processing plant shown in FIG. 2 comprises a reaction vessel 21 corresponding to that of FIG. 1. The vessel is surrounded by a tubular furnace 22 and is connected with two gas containers 23 and 24. The gas from container 23 passes through two washing flasks 25 and 26. The containers are connected with the processing vessel 21 by pipelines 27, 28 and 29. The residual gases leave the processing vessel 21 through an outlet line 30.

Figure 3:
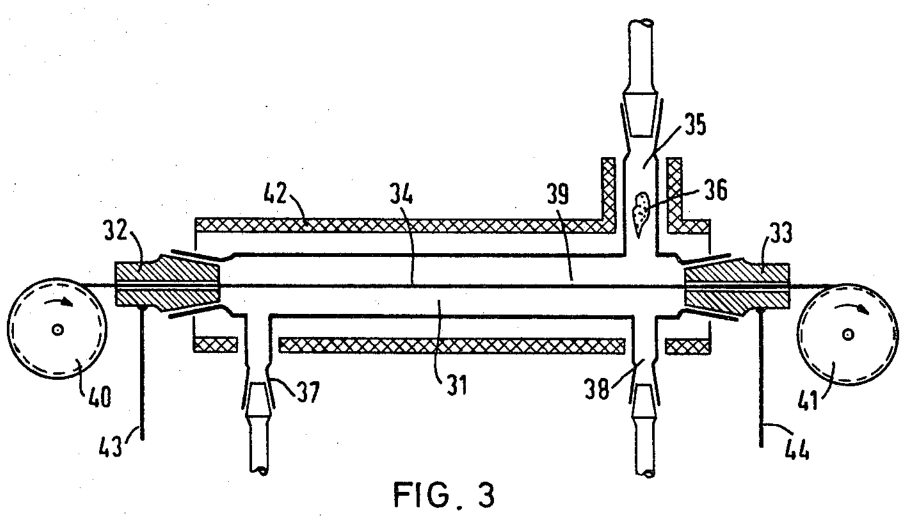
FIG. 3 is a sectional plan view of an embodiment of apparatus for precipitating superconducting compounds upon wire- or tape-shaped substrates, according to the method of the invention.

The apparatus according to FIG. 3 comprises a quartz tube 31 which has two lateral tubular branches 37 and 38 as well as a wider lateral branch 35. The solid starting material 36 for the reaction is located in the branch 35. The quartz tube 31 is closed at both ends by graphite stoppers 32 and 33 with respective center bores for the passage of a substrate 34 consisting of wire or tape. The substrate is pulled off a spool 40 and, after being coated in the processing tube 31, is wound upon a spool 41. The substrate is in conducting contact with the graphite stoppers 32 and 33. These are connected by respective leads 43 and 44 with an electric current source (not shown).

The reaction tube 31 is located in a tubular furnace 42, which may be longitudinally subdivided so that it can be opened. The tubular furnace also surrounds the branch portion 35. The superconducting compound precipitates upon the substrate 34 approximately at the location denoted by 39.

Figure 4:
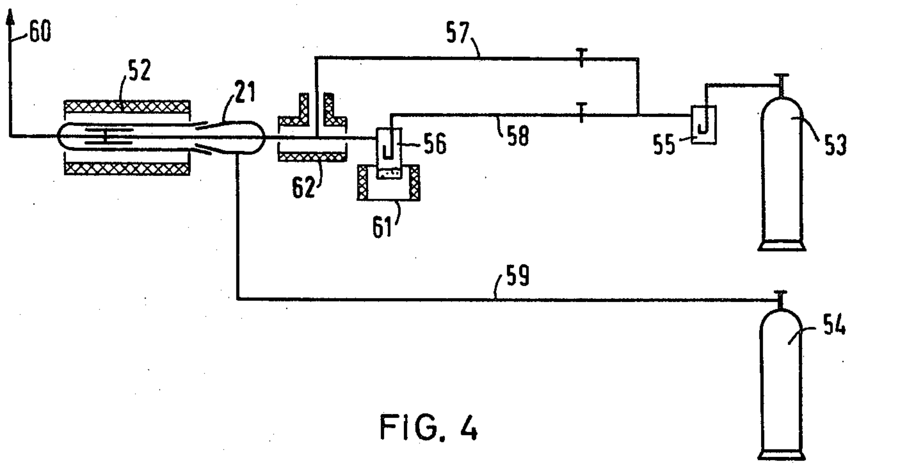
FIG. 4 shows schematically an embodiment of the entire plant for performing the method of the invention, using iodine as a reaction gas.

The plant shown in FIG. 4 comprises a reaction vessel 21 as described above with reference to FIG. 1. The reaction vessel is placed in a tubular furnace 52 and connected with two gas containers 53 and 54. The gas from container 53 passes through washing flasks 55 and 56. The connections comprise pipelines 57, 58 and 59, as well as two additional heating furnaces 61 and 62. The waste gases leave the plant through a line 60.

EXAMPLE 1

This example relates to one way of applying the method according to the invention for producing niobium stannate by reduction of bromides, using equipment as shown in FIGS. 1 and 2.

The starting material 18 is prepared by mixing niobium and tin in the stoichiometric ratio and forming pellets by pressing and pre-sintering. The pellets are placed into the inner tube 13 of the reaction vessel 21. The reaction vessel is thereafter heated in furnace 22 up to 1200° C., this temperature being still permissible for the quartz material. During the heating-up period, hydrogen is introduced from the gas container 24 through line 29 and nipple 16, and helium is introduced into the tube 21 from container 23 through the by-pass 27 and the inlet nipple 15. As a result, the air is driven out of the reaction vessel 21. When a vessel temperature of about 1000° C. is reached, the by-pass line 27 is closed by a valve, and the valve in line 28 is opened. Helium now flows through line 28 and the washing flask 26 which is filled with bromine, and the helium is thus charged with gaseous bromine. The height of the bromine column above the outlet capillary for the helium should be kept at an approximately constant level. This is the reason why the bromine is kept in the above-mentioned washing flask 26 which permits replenishing the bromine during operation of the plant.

When the bromine-laden helium passes over the starting material 18, niobium and tin are simultaneously converted into the bromides ($NbBr_3$/$NbBr_5$ and $SnBr_2$, $SnBr_4$) these bromides being gaseous at the high temperature. The hydrogen entering at the tubular member 14 through the outer tube 11, reduces the bromides to the metals. The resulting niobium stannate precipitates on the quartz wall of the tubular member 14. The residual gases issue through outlet nipple 17 and line 30. After terminating the precipitation process, the precipitated niobium stannate can be readily removed from the quartz wall of the tubular member 14 with the aid of a mixture composed of concentrated (40%) hydrofluoric acid and water in the ratio of about 1:5.

The quality of the resulting niobium stannate increases with a decrease in the flow rate of the helium and a decrease of the bromine quantity. The flow rate of the helium can be controlled in flask 25. The added quantity of bromine may be adjusted by correspondingly adjusting the height of the bromium level above the outlet capillary for the helium in flask 26.

In operations performed according to this example, the inner tube 13 had a length of about 60 cm. and a diameter of about 2.5 cm. A bromine gas throughput of 3 to 4 liters per hour resulted in good reaction products.

EXAMPLE 2

This example relates to the production of niobium-gallium ($Nb_3Ga$) by the method according to the invention. The production of $Nb_3Ga$ proceeds essentially in the same manner as the production of $Nb_3Sn$. The only difference is the following. For producing $Nb_3Ga$, the starting material is not placed in sintered form into the inner tube 13. The metallic constituents of the compound are rather placed separately into the tube 13 as shown in FIG. 1*a*. The niobium is placed at 101 in the vicinity of the tube end next to the tubular member 14, and the gallium is placed at 102 near the tube end close to the inlet nipple 15. The portion of the bromine entering through the inlet nipple 15 converts with gallium to the gaseous gallium bromides ($GaBr_2$ and $GaBr_3$). The non-converted bromine forms gaseous bromides of niobium ($NbBr_3$ and $NbBr_5$). The bromides of niobium and gallium become mixed with each other and are reduced at the end of the tubular member 14. The metallic compound niobium-gallium is precipitated at the quartz wall. The size of the tube and the bromium throughput were chosen as in Example 1.

EXAMPLE 3

The precipitation of the intermetallic superconducting compounds according to the invention need not necessarily be effected upon a quartz tube. Various other substrate materials are also applicable. For example, superconducting wires or tapes may be produced by precipitating the superconducting compounds upon wire- or tape-shaped metallic carriers, for example of steel or gilded nickel. The present example relates to the precipitation of niobium-tin ($Nb_3Sn$) upon a gilded nickel wire according to the method of the invention, employing equipment as illustrated in FIG. 3.

Used as starting material 36 are sintered niobium-tin pellets. These are placed into the branch portion 35 of the processing vessel. The gold-coated nickel wire 34 is inserted into the quartz tube 31 and is then pulled through the tube at a constant speed of about 1 m./min. An electric current is supplied through leads 43, 44 and the graphite bodies 32, 33 to pass through the wire 34. The current is rated to heat the wire 34 to 1100° C., although other temperatures between about 800 and 1400° C. are also suitable. The tubular furnace 42 is heated to 750° C., other temperatures of about 700 to 800° C. being also applicable. As a result, the starting material 36 is heated, and the precipitation of material upon the wall of the reaction tube is prevented. Bromine and helium are introduced through the lateral branch 35. The gaseous bromides of niobium and tin are thus formed at the starting material 36 and pass into the reaction tube 31 in mixture with helium. The air previously contained in tube 31 is thus driven out of the tube and though the outlet branch 37.

After this has taken place and the wire 34 has reached a temperature of about 1100° C., hydrogen is supplied to the reaction tube 31 through the inlet branch 38. The bromides of niobium and tin are now reduced in the immediate vicinity of the hot wire 34. The evolving niobium stannate precipitates onto the wire 34 approximately in the vicinity of the location 39. The stannate-coated wire is then wound upon the motor-driven take-up spool 41. The residual gases leave the vessel through the outlet branch 37.

In processes carried out in this manner, the reaction tube 31 was about 1 m. long and had a diameter of about 3 cm. The bromine gas throughput was about 3 to 4 liters per hour.

EXAMPLE 4

This example relates to the production of niobium-tin by reducing the iodides of the metallic constituents of this compound, using equipment as shown in FIG. 1 and FIG. 4.

The starting material 18 in the form of pre-sintered niobium-tin pellets is placed into the inner tube 13 of the reaction vessel 21. The reaction vessel 21 is then heated in the tubular furnaces 52 up to about 1000° C. During the heating-up period, hydrogen is supplied to the reaction vessel 21 from the gas container 54 through the pipeline 59 and the inlet nipple 16, and helium is simultaneously supplied from the container 53 through the by-pass line 57 and the inlet nipple 15. This drives the air out of the reaction vessel 21.

When the reaction vessel has reached the temperature of about 1000° C., the by-pass line 57 is closed and the line 58 opened. The helium now passes through the pipeline 58 and the flask 56 which contains solid iodine. In order to produce in the flask 56 a sufficient iodine vapor pressure, the lower portion of the flask is heated to about 80 to 100° C. with the aid of the furnace 61. In this manner the iodine vapor pressure is adjusted to approximately 50 torr (mm. Hg). The helium passing through the washing flask 56 becomes charged with iodine and passes into the inner tube 13 of the reaction vessel 21. To prevent condensation of the iodine vapor in the pipeline between flask 56 and the reaction vessel 21, this pipeline is likewise heated to a temperature between about 80 and 100° C. with the aid of the furnace 62.

As the iodine-laden helium passes over the starting material 18, niobium and tin are simultaneously converted to gaseous iodides. The flow of hydrogen entering at tubular member 14 through the outer tube 11, reduces the iodides, and the niobium stannate thus formed precipitates upon the quartz wall of the tubular member 14. The residual gases leave the reaction vessel through the outlet nipple 17.

In processes performed in this manner, the reaction vessel 21 had the same dimensions as in Example 1. The iodine vapor throughput was about 2 liters per hour.

In methods performed according to the invention, the transport gas need not necessarily consist of helium. Other gases which are inert with respect to the reaction are likewise applicable, for example argon.

I claim:

1. The method of producing superconducting niobium-gallium compound, which comprises passing gaseous halogen from the group consisting of bromine and iodine mixed with an inert transporting gas over heated quantities of niobium and gallium respectively and reducing the resulting gaseous halogen compounds of niobium and gallium to precipitate the evolving superconducting compound from the gaseous mixture.

References Cited

UNITED STATES PATENTS

| | | | |
|---|---|---|---|
| 3,075,901 | 1/1963 | Hutter et al. | 75—84.5 |
| 3,181,936 | 5/1965 | Denny et al. | 29—194 |
| 3,188,230 | 6/1965 | Bakish et al. | 117—107.2 |
| 3,216,822 | 11/1965 | Brothers et al. | 75—26 X |
| 3,268,362 | 8/1966 | Hanak et al. | 117—227 |
| 3,297,501 | 1/1967 | Reisman | 148—174 |

FOREIGN PATENTS

| | | |
|---|---|---|
| 468,796 | 10/1950 | Canada. |

HYLAND BIZOT, *Primary Examiner.*

H. W. TARRING, *Assistant Examiner.*

U.S. Cl. X.R.

29—194, 599; 75—.5, 84.4, 135; 117—107.2, 227